(12) United States Patent
Johnson et al.

(10) Patent No.: US 7,375,627 B2
(45) Date of Patent: May 20, 2008

(54) COLLISION DETERRENCE APPARATUS AND METHOD THEREFOR

(76) Inventors: Fred Johnson, 2308 E. Amerige Ave., Fullerton, CA (US) 92831; James Johnson, 6125 Ascot Dr., Oakland, CA (US) 94611

( * ) Notice: Subject to any disclaimer, the term of this patent is extended or adjusted under 35 U.S.C. 154(b) by 198 days.

(21) Appl. No.: 11/207,237

(22) Filed: Aug. 19, 2005

(65) Prior Publication Data
US 2007/0040664 A1 Feb. 22, 2007

(51) Int. Cl.
*B60Q 1/26* (2006.01)
(52) U.S. Cl. .................. 340/468; 340/435; 701/301
(58) Field of Classification Search ............ 340/468, 340/435, 436, 463, 467; 701/301
See application file for complete search history.

(56) References Cited
U.S. PATENT DOCUMENTS 4,320,384 A * 3/1982 Carlson ................ 340/467
4,600,913 A * 7/1986 Caine ................... 340/435
5,786,752 A * 7/1998 Bucalo et al. ........... 340/467
6,225,896 B1 * 5/2001 Sendowski ............. 340/467

* cited by examiner

Primary Examiner—Phung T. Nguyen
(74) Attorney, Agent, or Firm—Franklin E. Gibbs; Erick P. Wolf

(57) ABSTRACT

Collision deterrence system including signaling apparatus and method collision having frequency diversity, amplitude diversity, duty cycle diversity, and modal diversity and capable of being perceived by the following vehicle operator as being indicative of a lead vehicle motive state. The apparatus produces distinctive visual and aural signals constituting a characteristic hazard alert, representative of a lead vehicle motive state. The method generates an unambiguous signal representative of a predetermined hazard in the vehicle travel path. A collision deterrence diversity signaling method provides unique visual and audible signals directed toward a following vehicle operator, eliciting a REC avoidance response.

18 Claims, 6 Drawing Sheets

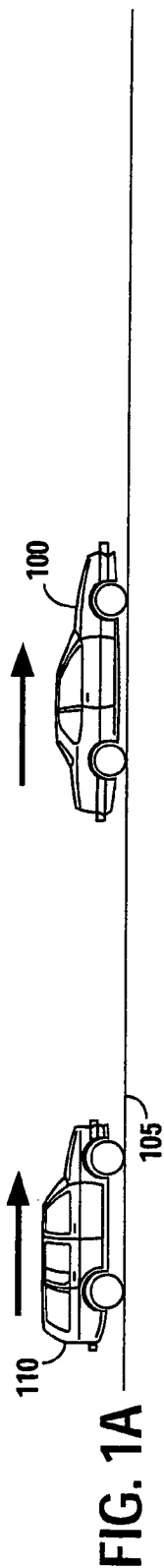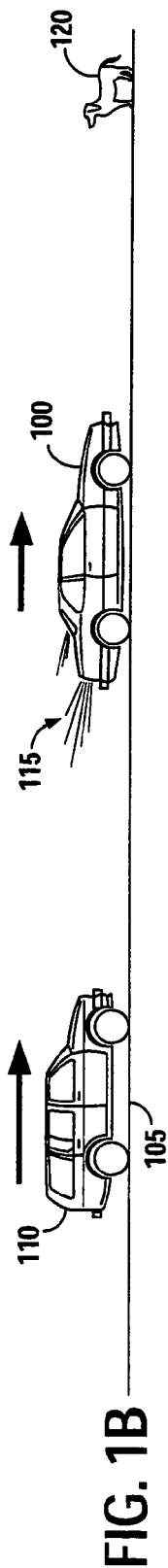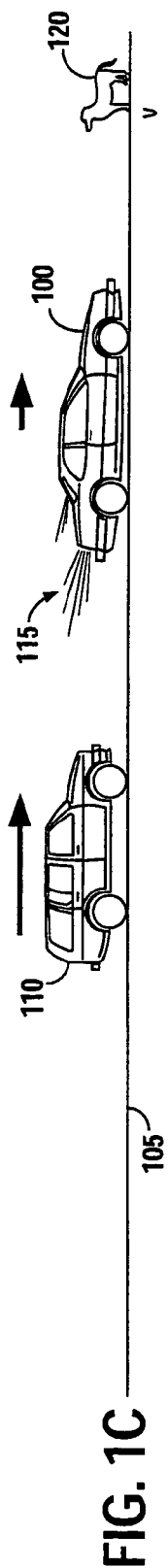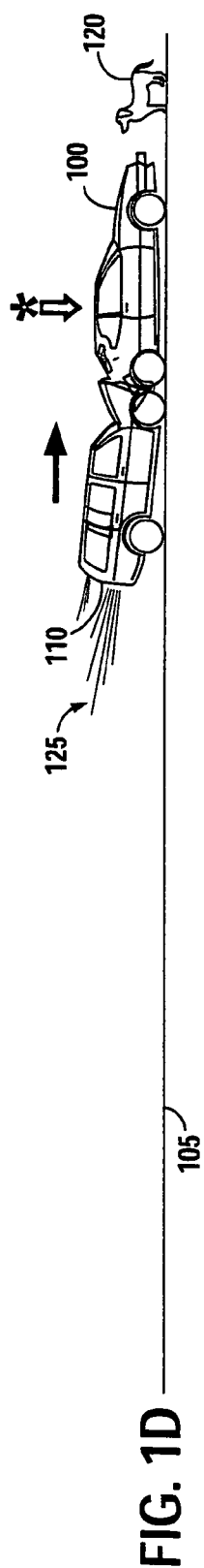

COLLISION DETERRENCE APPARATUS AND METHOD THEREFOR

CROSS-REFERENCES TO RELATED APPLICATIONS

[Not Applicable]

FEDERALLY SPONSORED RESEARCH OR DEVELOPMENT

[Not Applicable]

BACKGROUND

1. Technical Field

The present invention pertains to apparatus and methods for vehicular signaling and, in particular, to apparatus and methods by which a lead vehicle may emit a defensive signal for perception by a following vehicle 2. Description of Related Art Rear end collisions (REC) impose a staggering burden on society. The total money cost arising from personal injuries, lost wages, employer productivity, and property damage is estimated to be between $5 billion and $10 billion in the U.S. alone. In 1996, the National Highway Traffic Safety Administration estimated that about that 28% of all accidents involve rear-end collisions between a lead vehicle (LV) and a follower vehicle (FV). Highway safety studies indicate that a rear-end crash has about a 67% chance of generating a reported whiplash injury. As a result, rear end collisions annually result in damage to over 1.5 million vehicles and, importantly, cause over one million cases of whiplash injury.

Modern highways worldwide seem to become more crowded each day, with many metropolitan areas enduring chronically congested roadways. Public transportation and freight vehicles, with generally greater physical dimensions and operating at lower average speeds, are intermixed with more maneuverable, smaller private vehicles. Operators of all vehicles feel pressures to meet itinerary deadlines, especially during peak travel times, often leading to compulsive tailgating, abrupt lane changes, sudden braking, and intemperate driving. All too often, a REC occurs when a following-vehicle operator (FVO) fails to timely recognize an abruptly slowing, or stopped, vehicle in the road ahead.

Because more than 75% of REC accidents occur during daylight hours, with 90% occurring on straight roadways, driver inattention is believed to be the primary factor in over two-thirds of these collisions. Following too closely, or "tailgating," is thought to be the second most likely cause of REC. In nearly 90% of all REC, the imputed cause of the collision was one or both of inattention, tailgating, or both. A third major factor in REC is ambient lighting conditions. Poor lighting conditions reduces visual contrast and visibility, produces limited depth and motion perception, and demands longer periods of observation and processing of visual images.

Under reduced lighting, a vehicle operator typically takes longer to perceive, identify, and respond to a hazard, thereby reducing the time and distance available to take evasive measures. Some operators significantly misjudge the distance, motion, and size of objects in their path during dark hours, so that dark hour collisions tend to be preceded by less braking or evasion, and result in more forceful impacts. Surprising or unexpected operating situations may further increase an operator's response time, so that an unexpected hazard on a darkened road may elicit a fatally delay in the operator's response. Thus, for the 25% of REC that occurs during dark hours, the risk of severe injury or death trebles.

Attention, focus, and skilled responses are essential concomitants to any safe trip. However, these capabilities vary greatly among individuals. Some factors, such as operator age, bring both benefits and liabilities, with the experience and judicious vehicle handling exhibited by older drivers being a slight advantage over the sharp faculties and rapid reflexes of younger drivers.

Typically, an unimpaired driver exhibits a response latency of about 1.8 seconds, as measured from the moment the driver perceives a stimulus until the moment the driver reacts to the stimulus—but before the vehicle responds to the driver's actions. Under certain circumstances this response latency may be less; yet under others, such as with a distracted driver, response latency can be substantially greater. In the microcosm of rear-end vehicle accidents, a split-second makes the difference between a close-call and tragedy. For example, at a modest speed of about 30 mph (50 kph), a vehicle traverses approximately 85 feet (25 meters) during this response latency period, corresponding to nearly five-and-a-half car lengths of movement. At highway speeds of 55-70 MPH (88-100 kph), a 1.8 second delay translates into about 150-200 feet (44-60 meters) of movement. From a more familiar perspective, vehicles moving at speeds between 30 MPH and 70 MPH, move about one to three car lengths, i.e., 15-35 feet or 3-11 m in the blink of an eye.

For the most part, current vehicle safety research remains focused on devising apparatus and algorithms directed to collision avoidance and from the vantage of the FV operator (FVO), i.e., outfitting a vehicle in a defensive follower role (FV). In general, a FV safety system detects, and is responsive to, a sensed operational characteristic exhibited by a lead vehicle (LV), which is located at some distance ahead of the defensive follower vehicle (FV). One response of a FV safety system (hereafter, a collision avoidance system or CAS), is to produce a perceptible warning to the FVO, with the expectation that the perceived warning will be sufficiently timely for the FVO to avert or mitigate a rear end collision.

Common CAS tend to include, for example, systems based on forward-directed interrogation signals (e.g., RADAR) emitted by the FV, and reflected back to the FV from the LV. FV systems also may include ultrasonic, optical, and red-based forward position or zone analysis, radio geolocation and global positioning systems and devices, as well as any system or device disposed within a vehicle that performs forward-looking analysis of a LV characteristic. Haptic FV systems also are of recent interest because there is some indication that a CAS alert issued through contact with the operator's body (e.g., vibrating steering wheel or seat) may promptly elicit a desired response.

More complex and sophisticated CAS may not be desirable. In general, increasing the complexity of any system increases the likelihood of constituent component failure. While a sophisticated collision avoidance system may enhance the safety of vehicle occupants, its failure can nullify the advantages gained. Should the vehicle operator become lax in reliance on the CAS forewarning, a system failure may increase the operator's risk by offering a false sense of security.

By selectively adding redundancy to a CAS, a certain degree of failure can be accommodated, but redundant systems are frequently more complex, and costlier to purchase, operate, and maintain than their non-redundant counterparts. Moreover, some degree of error is inevitable in any system intended, by design, or by common usage, to serve as a surrogate for attentive, skilled human judgment, particularly in the unpredictable settings and environments that modern vehicles frequently encounter. Of course, a CAS can appreciably increase the cost of owning and maintaining a vehicle, which may be beyond the means of the average vehicle owner.

Despite extensive research and development into understanding vehicle and collision kinematics, human machine interfaces, and studies revealing a wide range of vehicle operator responses, collision avoidance systems lack widespread implementation or acceptance, ostensibly due to the significant complexity, cost, maintenance, interoperability, and reliability concerns, of vehicle manufacturers, public officials, and consumers alike.

In an attempt to provide an LV with additional visibility, automobiles in the United States have been equipped with central high mounted stop lamps (CHMSL). A CHMSL is typically positioned between, and vertically higher than the rear stop/brake lamps of a vehicle. Initially, the implementation of CHMSL seemed to account for a noticeable decrease in REC. However, over time, drivers appear to have become less responsive to this additional indication of the LV state. Indeed, a standard CHMSL does not provide more information to an FVO regarding the deceleration, or stationarity, of an LV. Traditional CHMSL indicate that the LV braking system has been activated, without offering unambiguous cues to an FVO regarding LV speed or deceleration. Moreover, it is now believed that CHMSL may not provide sufficient stimuli to seize the focus of an inattentive FVO, even as a supplement to the standard brake/stop lamping. It is desirable, therefore, to provide a simple, intuitive, relatively inexpensive vehicle signaling system that provides attention-alerting stimuli conducive to effecting rapid, accurate maneuvers by an FV driver, thereby avoiding or mitigating a rear-end collision.

SUMMARY

Embodiments of the present invention also comprehend a method for a lead vehicle to signal, indicative of a travel path hazard, to a following vehicle therebehind, including detecting a predetermined lead vehicle motive state, and providing a collision deterrence signal by the lead vehicle in response to the predetermined lead vehicle motive state. The collision deterrence signal is a characteristic hazard alert corresponding to the predetermined lead vehicle motive state. An embodiment of the characteristic hazard alert includes a collision deterrence diversity signal having at least one of a unique visual display and a unique aural display. The unique visual display can be disposed in a signal light array as a plurality of distinctive visual indicia in the form of intermittently or variably illuminated lights, giving the appearance of flashing, blinking, or traveling illuminated chevron shapes; and, where employed, the unique aural display can be in the form of a brief high-pitched diversity signal. The method also encompasses providing a distinctive visual display and a distinctive aural display, alone or in combination, uniquely representing the characteristic hazard alert corresponding to the predetermined lead vehicle motive state.

BRIEF DESCRIPTION OF THE DRAWINGS

FIG. 1A-1D depict serial illustrations representative of an evolving highway hazard event leading to a rear-end collision, for which embodiments of the present invention are adapted;

DETAILED DESCRIPTION OF EMBODIMENTS

Figure 2:
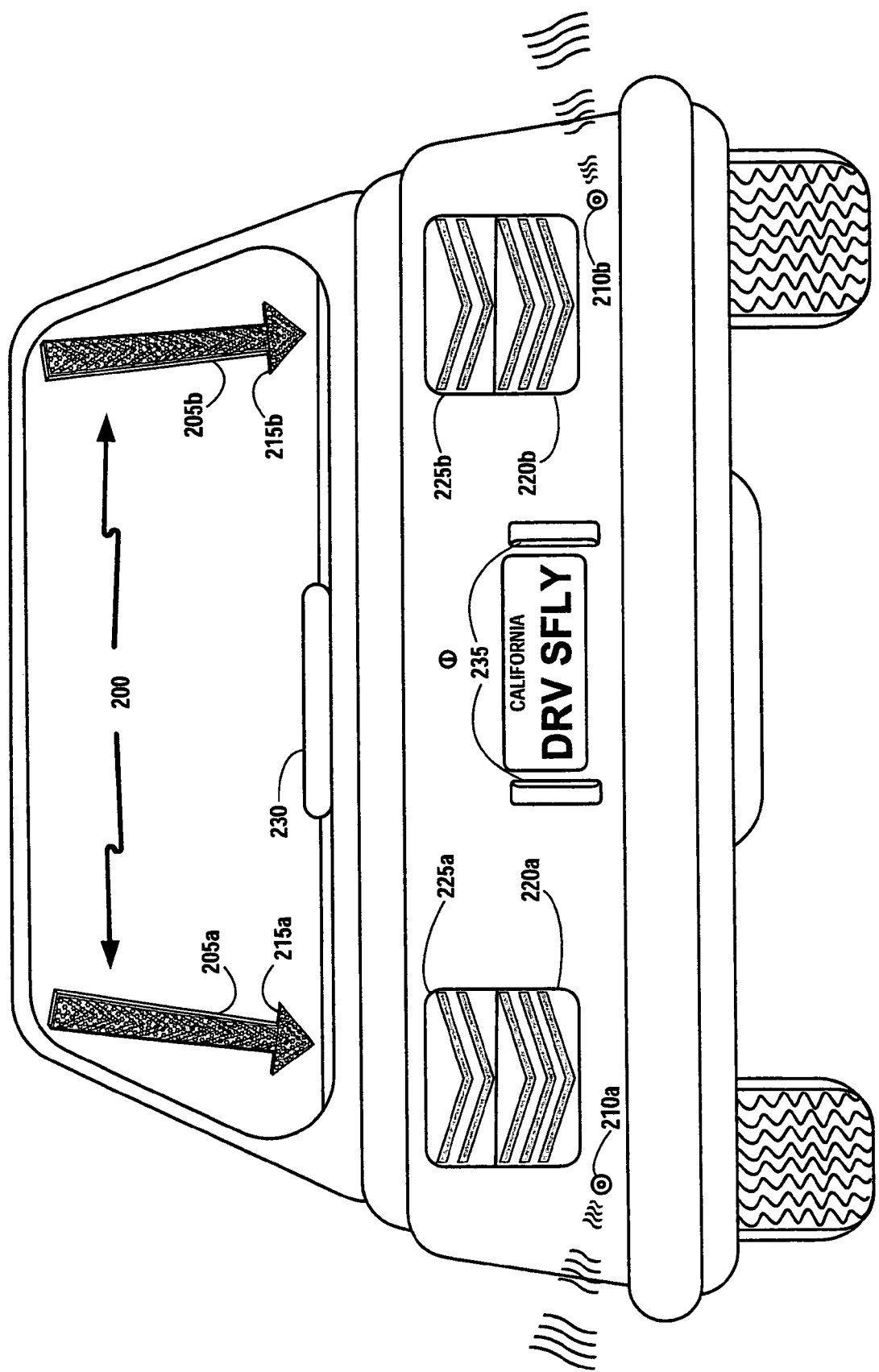
FIG. 2 is an illustration of one embodiment of the present invention, including one configuration of a collision deterrence signaling structure.

Embodiments of the invention herein provide apparatus and methods implementing a collision-deterrence signaling (CDS) by a lead vehicle (LV). The acronym CDSS is employed herein to describe a collision-deterrence signaling system, a signaling apparatus, which may a constituent of a CDS. Similarly, the acronym CDDS describing collision-deterrence diversity signaling, a signaling method, which also may be a constituent of a CDS. Although selected embodiments may include both CDSS and CDDS aspects, such is not required.

Furthermore, the term "lead vehicle" (LV) and "following vehicle" (FV) respectively designate vehicles traversing a common travel path in a general direction of vehicular movement, while disposed in a spaced-apart relationship. The spatial magnitude of the spaced-apart relationship is termed the leadway. Within this context, a LV can be a first vehicle that is forward-positioned relative to a second vehicle, namely, an FV. Likewise, an FV can be the second vehicle that is rearward-positioned relative to the first vehicle. Typically, a LV is operated by a LV operator (LVO) and an FV is operated by an FV operator (FVO). Desirably, an FVO is positioned in an FV to perceive a signal from a LV. FVO perception may be compromised or limited by any of a myriad of distressed behavioral, emotional, mood, or cognitive states of the FVO, contributing to inattention, distraction, forgetfulness, or diminished judgment. Beneficially, a LV CDS is generally configured to emit a characteristic hazard alert capable of seizing the attention of an FVO, and of prompting the FVO to defensively maneuver the FV by reflex to defensively avoid or mitigate an imminent REC.

Advantageously, nearly any single- or multi-unit conveyance may benefit from a CDS, particularly vehicles having a fore, or front end, and an aft, or rear end, and designed to traverse a common travel path in a general direction of vehicular movement. A single conveyance can be a vehicle that combines motive and transport functions, for example, an automobile. In a multi-unit conveyance, at least one power unit applies motive force to one or more transport units, which may be coupled thereto. Such a vehicle may be suitable for terrestrial operation, below, upon, or above the earth's surface. Thus, without limitation, a vehicle may be an automobile, a bus, a van, a truck, a railcar, a rail train, and other conveyances, whether the units carry persons, objects, or both. A travel path may connote a street, road, highway, freeway, byway, tramway, railway, spur, channel, waterway, or any other vehicular conduit or zone of operation.

Turning to the disclosed FIGURES, FIG. 1A-1D depict the evolution of one common rear-end collision scenario. For example, in FIG. 1 A, the scenario begins by depicting lead vehicle (LV) 100 and follower vehicle (FV) 110 traveling on roadway 105 at a first speed and separated by leadway having a first distance. Each of vehicles 100 and 110 are depicted as using standard 3-signal braking lights.

FIG. 1A depicts both vehicles as traversing travel path 105 at a first speed, and in the same general direction. In FIG. 1B, a hazard event is initiated, for example, by small animal 120 intruding into the path of LV 100 on travel path 105. Sensing this hazard event, the LVO responds reflexively by applying the LV brakes. Because the LVO evasive response is reflexive, and not preceded by analysis and response selection, the LVO response latency is generally low, and the reflexive response, appropriate. Once the LVO applies pressure to the vehicle brake, LV deceleration begins, and the standard vehicle brake lights, generally at 115, are actuated. However, under this scenario, the FVO may be unaware of the emergent road hazard, and of the reactive braking and deceleration of LV 100, allowing FV 110 to travel at the first speed.

In FIG. 1C, LV 100 continues to apply brakes (indicated by LV brake lights at 115), and to approach a stop as it nears hazard 120. Although the LVO may appropriately maneuvering LV 100 to avoid hazard 120, the LVO faces yet another, potentially more harmful hazard—being struck from the rear by FV 110. When the FVO does not mount a timely and effective response to the looming collision, the leadway between LV 100 and FV 110 closes quickly, creating an imminent peril for the occupants of both vehicles. In some cases, an inattentive FVO may be oblivious to an imminent REC between FV 110 and LV 100 until immediately before the collision—if at all. Unless some intervention seizes the full attention of its operator in time to avoid an impact, FV 110 may impose a significant destructive force on LV 100.

FIG. 1D depicts a rear-end collision that can be caused the FVO failing to bring FV 110 under control and to take evasive maneuvers (e.g., braking, steering). In this example, although the illumination of braking lights at 125 indicates that the FVO may have applied braking just prior to the collision; the effort was insufficient to avoid a REC. In many instances, an REC may be mitigated, if not avoided entire, if the FVO receives sufficient forewarning. If disposed and operational aboard FV 110, a CAS may bring the full attention and faculties of the distracted FVO to bear to maneuver FV 110 away from a REC. In this way, a CAS may capture the attention of an inattentive operator prior to a collision. Nevertheless, in the case of an imminent collision, time is of the essence. The more quickly an effective response can be elicited from an FVO, the less likely FV 110 will collide with LV 100.

In general, a collision avoidance system (CAS) employs one or more sensors to detect a relative motive state of a forward-positioned vehicle (i.e., a LV). Thus, a vehicle outfitted with a CAS is adapted to the role of a FV, sensing the motive state of a LV. The CAS typically includes a processing unit to analyze the sensed LV data and an indicator to issue alerts and warnings to the FVO, indicative of a selected LV motive state. Even if FV 110 was outfitted with a CAS, the CAS bears the burden of sensing environmental and vehicular data, analyzing that data, recognizing a potential hazard in the data, and generating issuing an alert of the upcoming hazard to the FVO. In order to minimize false positive alerts, a CAS may need to verify an initial, positive, "collision-impending" indication by allowing FV 110 to advance some distance toward LV 100 before providing the FVO with perceptible notification regarding, a hazard alert state. The sum of the sensing, analysis, and processing delays may be termed CAS latency. CAS latency can be consequential, because time is consumed during each step of the CAS warning process and, during that time, FV 110 is moving closer to LV 100.

Once alerted by the CAS, FV 110 continues apace toward LV 100 during the FVO response latency period. During the FVO response latency period, the inattentive FVO: recognizes the CAS alert; shifts attention from a diversion and to the situation ahead; comprehends the nature of the hazard; formulates a response; and initiates a response, in an attempt to evade the hazard. In addition to the CAS and FVO latency periods may be the vehicle latency period, extending from the time the FVO initiates a response until the moment the FV reacts to the FVO input. Thus, the time required by the CAS to sense, analyze, and indicate LV motive state tends to be additive to the inherent response latency of the FVO and the FV. A delay of this type may leave insufficient time for FV 110 to be maneuvered away from a REC with LV 100.

CDS embodiments of the present invention provide an LVO in LV 100 with apparatus and techniques to initiate a defensive alert to an FVO, generally prior to a warning signal being issued by a CAS, if the FV were so equipped. Even if FV 110 lacks a CAS, the embodiments herein are adapted to cause the LVO to seize the attention of an FVO, so that the FVO can become aware of, and respond reflexively to, a type of imminent travel path hazard. It is desirable that embodiments of a CDS generate a diversity signal that is issued as a characteristic hazard alert. The characteristic hazard alert is adapted to be representative of a predetermined motive hazard, thereby being suitable for use as a trigger to a preselected FVO reflexive behavior. The characteristic hazard alert is adapted to quickly seize the attention of an FVO, and to cause the FVO to reflexively react to the characteristic hazard alert, thereby bringing the FV under control more quickly than otherwise would occur with an ambiguous warning signal, including existing warning signals.

A diversity signal includes at least two of spatial diversity, frequency diversity, amplitude diversity, color diversity, duty cycle diversity, temporal diversity, and modal diversity, as well as effective combinations thereof. CDS signals may include selected electromagnetic signals, such as visible light and radio signals, as well as selected mechanical signals, including acoustic waveforms such as audible sound and ultrasound, and physical indicia such as motion-based flags, semaphores, and the like.

An example of spatial diversity can include an array of multiple lights, possibly configured with non-uniform spacing; an example of frequency diversity can include an audible signal, which may contain audio components having different frequencies (or wavelengths). Also, temporal diversity can be exemplified by a signal that is produced with different beats, tempos, pauses, and so forth. In amplitude diversity, variations are imposed on the amplitude of a sound (loudness), or of light (brightness), or of other diversity dimensions. Color diversity may be implemented as selective proximate positioning of light sources having different colors. Modal diversity can be exemplified by a signaling scheme that employs spatial diversity, frequency diversity, amplitude diversity, color diversity, duty cycle diversity, and temporal diversity, as applied to at least one of an electromagnetic signal and a mechanical signal. Modal diversity also may encompass a signal that employs two or more subtypes of similar diversity, e.g., acoustic signaling, which emits a first audible signal corresponding to a first LV operational characteristic or motive state and a second audible signal corresponding to a second LV operational characteristic or motive state.

Moreover, the term "diversity" incorporates the full breadth of signaling variants, for example, from signals emitted in an essentially pseudorandom manner, to those signals bearing some preselected encoding, e.g., emitted with a characteristic pattern using a preselected signal transmission technique, or arranged in a preselected spatial arrangement having a characteristic meaning. This aspect can be employed advantageously because an encoded signal can deliver a predefined cue, urging specific perceivers to engage in a specific pre-determined vehicle maneuver. Given the teachings herein, an ordinary artisan could readily devise a myriad of variations and permutations of signal types and diversity types, all of which are encompassed within the scope of this disclosure.

FIG. 2 illustrates an exemplary collision deterrence signaling structure (CDSS), generally at 200, coupled to vehicle 210. In this example, vehicle 210 is equipped as a lead vehicle (LV), that is, enabled to issue at least one CDDS signal to an FV operator. In this example, CDSS 200 is provided with parallel columns 202a, 202b generally disposed at the rear of vehicle 210 and oriented to be perceptible therebehind. However, CDSS 200 also may be disposed as a one or more devices positioned and oriented such that visibility of an FVO is maximized. CDSS 200 also may be integrated within at least one of the three lamps of the current standard rear light configuration.

In embodiments of the present invention, such as CDSS 200, the desired enhanced conspicuity can be provided by a characteristic hazard alert, including at least one of unique visual display and a unique auditory display. Desirably, a characteristic hazard alert is characteristic of, and responsive to, a predetermined motive hazard, for example, forward of an LV. A characteristic hazard alert can be adapted to seize the attention of, and to induce a corresponding preselected behavior by, a FVO. Most desirably, an issued characteristic hazard alert reflexively induces the corresponding preselected behavior in the FVO. That is, upon perceiving a characteristic hazard alert, an FVO may initiate the corresponding preselected behavior, even before becoming fully cognizant of the existence of the predetermined motive hazard, or of the particular hazard condition establishing the predetermined motive hazard.

Where a characteristic hazard alert produced by CDSS 200 includes a unique visual display, it may be advantageous to dispose flashing lights in the display. Flashing lights are generally accepted to be superior to steady signals in gaining attention. Because a driver's visual field is primarily peripheral, and not foveal, the attention-seizing effect of flashing lights seems to not to depend on the direction of a driver's visual fixation. Thus, flashing lights can elicit the attention of an inattentive driver more readily than steady lights, and may offer the advantage of reflexively inducing a preselected FVO behavior. As intended herein, flashing may include flashing, blinking, strobing, or scintillating, as well as any intermittent illumination, whether periodic or aperiodic. For example, where a characteristic hazard alert indicates a predetermined motive state arising from an LV panic stop, the unambiguous motive alarm can generate a unique visual display including selectively flashing lights. Upon perceiving the flashing lights of the unique visual display, the FV reflexively initiates a maneuver to avoid or to mitigate a rear-end collision with an LV. Further, it may be beneficial that lights visible from the same side of the vehicle flash in unison so as to "outline" LV 210, and selected embodiments of the present invention may be so configured.

Because it is beneficial that embodiments of a CDS generate a characteristic hazard alert adapted to represent a predetermined motive hazard, embodiments of the present invention can include a CDSS configured to include a distinctive visual CDS signal as well as a distinctive aural CDS signal. One useful and distinctive visual CDS signal can be produced by selectively energizing signal lights of the respective signal light arrays disposed CDSS columns 202a, 202b to provide a unique visual display. The unique visual display can be a plurality of distinctive visual indicia in the form of repeating intermittent or variable illuminated lights, giving the appearance of, flashing, blinking, cascading, or traveling illuminated shapes. Desirably, motion perceived in the lights proceeds generally "downward" from an upper vertical location to a lower vertical location; and the form of the illuminated shape resembles a generally downward-pointing "V," or chevron, although other distinctive shapes may be used. Thus, the exemplary characteristic hazard alert will resemble cascading, or downward moving, bright chevron shapes to indicate the predetermined motive hazard of an abrupt "panic stop" by the LVO. Also, alternatingly flashing chevrons at the bases of columns 202a, 202b, may be indicative of the predetermined motive hazard of a stopped lead vehicle, although it may be advantageous to continue displaying the cascading chevron display when the vehicle is stopped. Sonic emitters 202a, 202b may produce a distinctive CDDS aural signal that is adapted to seize the attention of an FVO not aware of the aforementioned visual display; to be quickly recognized by the FVO, perhaps even before the FVO directs visual focus to the distinctive visual signal; and to make the FVO aware that a reflexive response, and vehicle maneuver, is required. Such a distinctive aural signal can be a brief high-pitched squealing sound that is capable of being heard over high-level highway sound, but that is not disturbing enough to the FVO to reduce reaction time.

Desirably, inventive embodiments of CDSS 200 can be actuated, substantially concurrently, with the response of the LVO of lead vehicle 210, which typically actuates one or more of standard vehicle lights for braking 220a-b, turn/hazard 225a-b, third-light braking 230, and rearward movement indicators 235. Although CDSS 200 can incorporate therein the operation of standard lights 220a-b, 225a-b, 230, and 235, and coordinate actuation of alert and warning annunciators therewith, CDSS 200 can be configured as a stand-alone system, which provides CDSS 200 separable from LV 210 and apart from, even if coordinated with, the actuation of the standard vehicle lights. To further increase conspicuity of LV 210, dark vehicle illuminators 240a, 240b may be disposed on the aft of LV 210 and positioned to illuminate LV 210, particularly when other lights 220a-b, 225a-b, 230, 235, may be extinguished. Thus if LV 210 is stationary and otherwise unpowered, it nevertheless may be sufficiently illuminated to assist FV and other vehicle operators in avoiding a REC. Dark vehicle illuminators 240a-b may be supplied power by the energy source of LV 210 (e.g., battery or fuel cell) or it may be provided with an energy source during routine vehicle operation, such as by an onboard solar panel (not shown). Furthermore, dark vehicle illuminators may be constructed of a transmissive material having refractive and reflective qualities, such that some of the light from the headlights of approaching vehicles may be reflected onto LV 210 aft.

Embodiments of CDDS 200 can use diversity signaling, employing at least one of spatial diversity, frequency diversity, temporal diversity, amplitude diversity, color diversity, and modal diversity. Such diversity may further heighten the focus and cognitive state of perceiving vehicle operators. By the LVO actuating CDDS 200 as an imminent travel hazard evolves, diversity signals from LV CDDS 200 can seize the attention of a following vehicle operator, thereby bringing the FVO to an awareness of the imminent predetermined motive hazard, and urging the FVO to evasively maneuver the FV so that a rear-end collision with LV 210 may be deterred.

Selected embodiments of the CDSS 200 apparatus herein can be implemented as signaling structure coupled to a first vehicle, e.g., LV 210 that emits at least one diversity signal in response to, and indicative of, a motive state of the first vehicle, such that the at least one diversity signal is perceptible to an operator of a second vehicle, e.g., the FV (not shown). Desirably, the signaling structure (generally, CDSS 200) is physically attached to the first vehicle and adapted to receive first vehicle operational signals which are representative of a first vehicle motive state. CDSS 200 can be realized using one or more annunciators cooperating to produce the at least one diversity signal (CDDS). Exemplary annunciators can include one or more of lamps 240, 245, 250, and 255, illuminated indicia 260, high-intensity lights 265, light array 270, and acoustic emitter, or speaker, 275. Although shown as a symmetric configuration, CDSS 200 is not required to be. Constituent signaling structure annunciators 240, 245, 250, 255, 260, 265, 270, 275 can be disposed to substantially increase conspicuity of the first vehicle, e.g., LV 210, from the vantage of the second vehicle. Also, selected ones of the annunciators can be configured to effect a preselected spatial diversity. Further, the preselected spatial diversity may encode a visual diversity signal (CDDS) to announce a predetermined first vehicle motive state.

In one aspect of spatial diversity, as may be employed with array 270, CDSS 200, may include, without limitation, a two-dimensional upwardly progressive expansion of light sources in array, with the number of lights increasing, and the distribution of constituent lights becoming more dense, along a vertical dimension of array 270. Array 270 may employ ranks of lights having different colors and different maximum intensities, with the distribution of light source spatial density, colors, and intensities also varying along one or both of the horizontal and vertical axes of array 270. As in array 270, one or more of annunciators 240, 245, 250, 255, 260, 265, also may integrate other forms of diversity, such as color diversity, temporal diversity, and amplitude diversity therein, using lights having multiple color, intensity, and duty cycle qualities, so that the presented color and intensity of visual CDDS are better suited to seizing the attention of an inattentive FVO. Moreover, acoustic annunciator 275 can be adapted and operated to provide intense bursts of CDDS alert sounds 280 with varying frequency and tempo. Annunciator 275 can be coordinated with visual annunciators 240, 245, 250, 255, 260, 265, 270, so that preselected patterns or progressions of CDDS alerts or warnings may be generated and projected rearward to the FVO in a follower vehicle.

The aforementioned ranks of lights may have alternating rows of red, white, and amber lights therein, with selected ones of the lights being flash, pulsed or strobe lights, and selected others being blinking or torch-mode lights. Suitable lights may be incandescent-type devices or may be metal-halogen or gas discharge device, high-efficiency light emitting diodes, or other high-intensity light source device. Light having amber and red tend to signify "danger," and this has led to their popularity as caution and warning identifiers, respectively. However, it has been observed that, at visual threshold levels, an amber light may be mistaken for a white flash. Also, red lights are considered by some to be weakly visible and easily lost in tail lamps. Moreover, red is psychologically associated with rage and passion, and may be a distractor. Nevertheless, the perceived limitations of such colors can be overcome, for example, by combining colors to produce a conspicuous, characteristic visual display, which also can be enhanced by the addition of other forms of signaling diversity (CDDS).

Intense bursts of sound can be directed rearward of LV 210 by sonic emitter 202a-b, which can be, for example, a horn sounder, a piezo-electric transducer, a magneto-electric vibrating diaphragm, or other acoustic driver, configured to be capable of producing the intensity of acoustic CDDS desired to seize the attention of an FVO. Colors, sounds, intensities, modes, and other diversity dimensions may be selected to enhance the conspicuity of LV 210, and to suit the particular situation, weather conditions, or other factors, contributing to rear-end-type collisions.

In one exemplary embodiment, then, CDSS 200 can be configured to produce a CDDS in the form of a characteristic hazard alert that includes, in combination, a distinctive visual signal and a distinctive aural signal. Certain selected embodiments can be disposed to produce a CDDS such as a distinctive visual display resembling downward moving chevron shapes, accompanied by a distinctive aural signal including a sound capable of being heard over high-level highway sound, to unambiguously alert an FVO that an LVO is executing an abrupt "panic stop," presenting the FV with a first predetermined motive hazard. Advantageously, columns 205a, 205b can be implemented using an array of high-intensity light-emitting diodes (LED), which include subarrays of interleaved colors such as white, amber, and red, which lights are controlled by commonly available LED driver and electronic light sequencing components. Because LEDs can arrive at full intensity in about 200 msec less time than standard incandescent bulbs, the advantages of the compact, long-life, and low-power consumption of LEDs is augmented in this application by the additional safety factor of more rapid visualization by an FVO. Sonic emitters 202a-b can be mounted on, or within, the body of LV 210, to direct the distinctive aural signal towards an FVO, thereby being suitable for use as a trigger to a preselected FVO reflexive behavior. Such emitters 202a-b can be directional horn sounders, piezo-electric actuators, pneumo-acoustic diaphragms, and other suitable devices. Alternatively, columns 205a, 205b may be fitted with one or more rearward-facing sonic emitters. Beneficially, an FVO can reflexively react to the characteristic hazard alert, minimizing, if not obviating, the time-consumed as an FV cognitively processes an ambiguous hazard or alert, formulates a response, and then executes the formulated response.

With respect to physical attachment to the first vehicle, contemplated CDSS 200 may be suitably configured for use throughout a spectrum of deployments. For example, one exemplary configuration, CDSS 200 can be adapted for substantially long-term affixment to a particular first vehicle. A long-term configuration may employ rivets, welds, pins, keyways, epoxies, and the like, to affix the signaling structure to the first vehicle in the desired placement for substantial periods of time and, perhaps, under a variety of operational environments. In another exemplary configuration, CDSS 200 can be detachably affixed, as well as be adapted for substantially portable or temporary use. Portable signaling structures can be affixed using clamps, latches, keyways, bands, cables, hook-and-loop holders, and so forth, or any arrangement by which suitable attachment can be achieved. A portable structure can be deployed for a particular purpose, on a particular vehicle, or on a particular unit (e.g., rear-most) of a multi-unit vehicle.

CDSS 200 also are communicatingly coupled to receive from the first vehicle (i.e., the LV) a first vehicle operational signal, which is representative of a first vehicle motive state. Where the operational signal is an electromagnetic signal, the vehicle may be coupled to CDSS 200 by a wired signaling link, a wireless signaling link, or a cooperating combination thereof. An operational signal may also be conveyed in other forms, including without limitation, a mechanical, an optic, an acoustic, a hydraulic or a pneumatic form. If necessary, in such a case, the first vehicle operational signal can be transmitted to the respective signaling structure using, for example, a signal translator, converter, or transponder, all of which are well-known in the signaling and vehicular arts. When the first vehicle motive state is indicative of a first predetermined motive hazard, CDSS 200 can emit a characteristic hazard alert (CDDS) to rearward-positioned FVO.

Advantageously, CDSS 200 can be implemented using sturdy, mass-produced, generally inexpensive components, and affixed by the vehicle manufacturer or OEM, by vehicle dealers and after-market vehicle outfitters, and, for some embodiments, by vehicle maintenance personnel or owners. Among the public benefits anticipated are reduction of rear-end collisions, with a concomitant increase in traveling safety, with the improved safety margin being gained at a modest cost, relative to existing and proposed complex CAS systems and methods.

Figure 3:
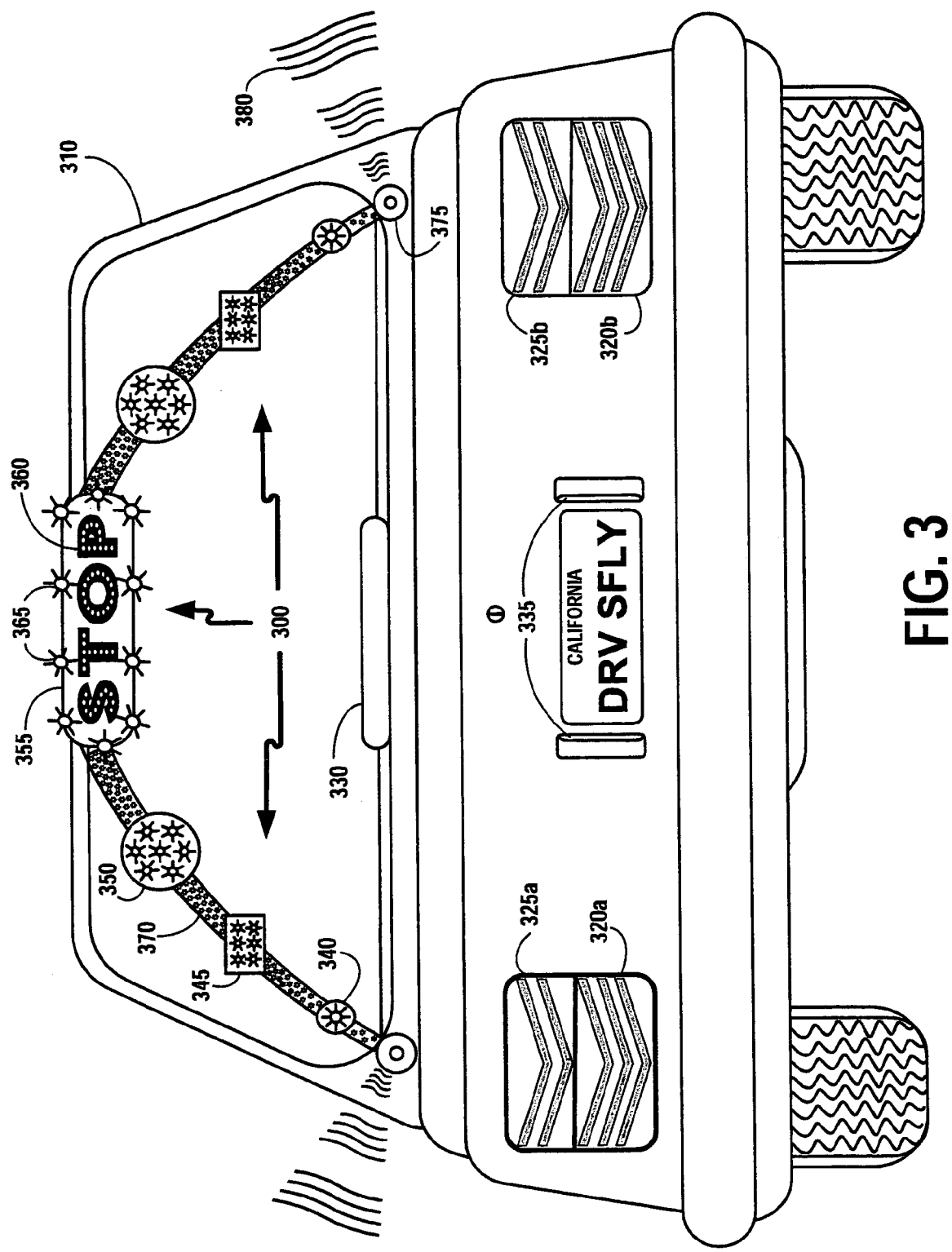
FIG. 3 is an illustration of another embodiment of the present invention, including another configuration of a collision deterrence signaling structure.

FIG. 3 illustrates another embodiment of CDS generally at 300, disposed on a single-structure CDSS 370 and mounted on vehicle 310. CDS structure 370 includes multiple distinctive display annunciators 340, 345, 350, 365, as well as directive annunciator 355 bearing informational indicia 360. The obverse surface of CDSS 370 may also bear numerous lights of the incandescent, vapor discharge, or LED variety, although LED display have the advantage of quicker illumination and higher intensity than some other types of lights. Although a range of shapes and sizes of annunciators are illustrated by display annunciators 340, 345, 350, 365, such is not a requirement to practice the present invention. However, it is desirable that lights implemented on CDSS 370 produce a distinctive visual signal, indicative of a characteristic hazard alert, in response to a preselected lead vehicle motive state. The preselected lead vehicle motive state generally corresponds to a predetermined travel path hazard, to which the lead vehicle operator responds. Directive annunciator 355 is illustrated to provide unambiguous information for perception by an FVO, such as the indicia 360 "STOP". Indicia 360 also can be adapted to display information relative to the distance between and the speeds of LV 310 and a follower vehicle, including, without limitation, closing speed, current distance, LV speed, and the like. Annunciator 355 also is exemplary of the breath of diversity signalers that may be employed. However, any of the presented numbers, symmetry, structures, forms, and placements of the various annunciators herein is exemplary only and is not required to practice the invention.

CDS structure 370 may include one or more acoustic or sonic emitters 375 that produce a distinctive aural signal 380, produced according to a preselected CDDS signal pattern, which may be constituent of a characteristic hazard alert, in combination with annunciators 340, 345, 350, 355, 360, 365. CDS 300 may be implemented to function as a supplement to standard vehicle lamping, including rear brake lights 320a, 320b, rear turn indicators 325a, 325b, CHMSL 330, and reverse motion lights 335, as may be an after-market accessory. CDS 300 also may be factory installed and integrated with the functions of lights 320a, 320b, 325a, 325b, 330, and 335. For example, one or both pairs of rear brake lights 320a-b, and rear turn indicators 325a-b, may be disposed to emit a distinctive visual signal representing a characteristic hazard alert to rearward-positioned FVO, responsive to a predetermined motive hazard. In certain embodiments, lights 320a-b and indicators 325a-b can be operable to produce a first characteristic hazard alert in the form of flashing chevrons evocative of rapid downward motion to indicate a first characteristic hazard alert, e.g., an LV panic stop; and in the form of alternative flashing chevrons to indicate a second characteristic hazard alert, e.g., a stopped or slow-moving LV.

Figure 4:
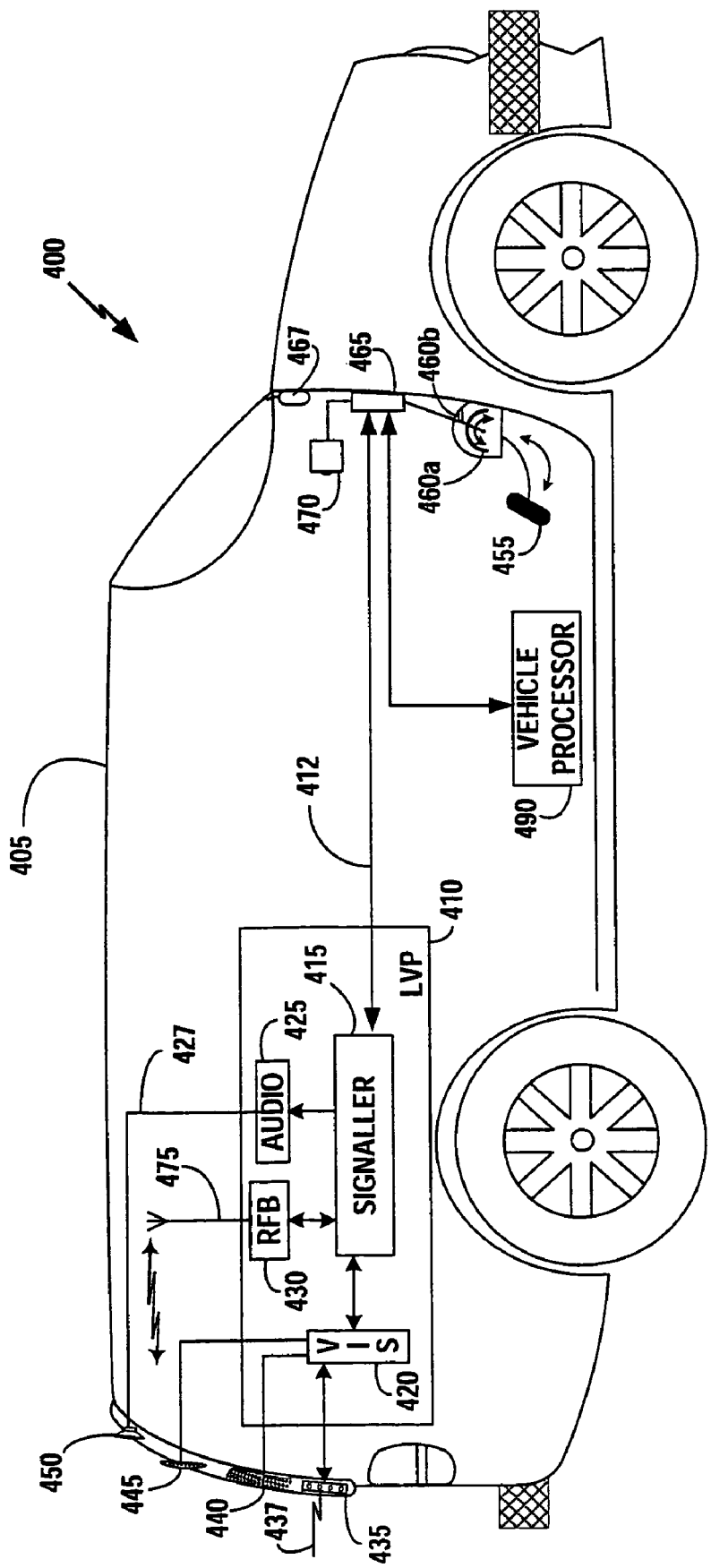
FIG. 4 is a cross-sectional illustration of a vehicle, in which an implementation and aspects of the present invention are diagrammatically displayed.

FIG. 4 illustrates one embodiment of CDS generally at 400, disposed in vehicle 405. Similar to CDS structure 202a, 202b in FIG. 2, and CDS structure 305 in FIG. 3, CDS 400 may include CDS structure 407. CDSS 407 can have both visual annunciators 440, and 445, as well as acoustic annunciator 450. Annunciators 440, 445, and 450 can be selectively actuated by lead vehicle processor (LVP) 410. LVP 410 may include signaler 415, which is disposed to receive operational signal 412. Signaler 415 can selectively direct an actuation signal to one or both of visual annunciator processor 420 and audio annunciator processor 425, individually, substantially simultaneously, sequentially, or in some combination thereof. Processors 420, 425 may incorporate therein power driver apparatus (not shown) to power and facilitate operation of annunciators 440, 445, 450, although such drivers are not a requirement to practice the present embodiments. Despite processors 415, 420, 425 being shown as separate entities, the present state of the signaling device arts, enables LVP 410 to be implemented as a single, integrated processing element; as multiple, cooperating integrated circuits; and as multiple discrete elements, alone or in cooperative combination.

Where it is desirable to provide direct signaling to an FV, signaler 415 also can actuate wireless device (RFB) 430, for example, to retrodirectively transmit an emergency beacon signal to the FV (not shown). Such communication can be used, for example, to actuate a "last chance" imminent hazard alarm in an FV CAS. Due to signal attenuation by fog, rain, or other environmental conditions, RFB 430 can be adapted to emit signals in one or more selected RF frequencies, and may be embodied for generally short-range (about <200 m -500 m) transmissions. Simple, low-power, short-range, reconfigurable radio transceivers are becoming increasingly inexpensive, so that RFB 430 can be implemented as a bidirectional signaling device, by which LV 405 may communicate with a nearby FV, information relative to the operational and motive state of LV 405. To reduce complexity, cost, and maintenance, as well as to increase reliability and acceptance, RFB 430 can be implemented in an application-specific IC (ASIC) for communication, which currently abounds in number and diversity.

RFB 430 may communicate a limited number of encoded signals with another LV 405 similarly disposed with CDS 300, and also may offer simple alerts and advisories to an FV CAS. This functionality allows an LVO in LV 405 to communicate substantially directly with an FVO through a receptive apparatus 467 in an FV (e.g., an FV CAS, similar CDS 400 disposed in an FV, or signaling adapter for standard automotive radios), by actuating CDS 400 with a preselected signaling action. For example, rapid, hard braking by the LVO, which activates LV 405 antilock braking system (ABS), may cause RFB 430 to send a signal encoded to signify "DANGER AHEAD!" to the FV CAS. In turn, the FV CAS provides the FV with a perceptible indication of the imminent hazard. The preselected signaling action can be coordinated with LV actions, which typically are undertaken only in severe circumstances (e.g., a rapid, hard braking, which activates LV 405 ABS or a LV airbag deployment) to limit erroneous or untrustworthy LVO signaling.

Moreover, in selected embodiments, it may be desirable to dispose red (IR) transceiver 435, which may be a single LED, LED array, or other suitable, inexpensive form of signaling and sensing. IR transceiver 435 can direct a low-powered IR beam 437 rearward to impinge upon and be reflected by an FV (not shown). Reflected beam 437 may then be sensed by transceiver 435, and be used to compute in visual signal processor 420 time/distance parameters such as closing speed, LV-FV headway, etc. If desired, such parameters may be displayed by annunciators 440, 445 to be perceived by an FVO.

In certain embodiments, it is desirable that the LVO of LV 405 not actuate CDS 400 simply by applying force to the brake pedal 455 in the manner typical of routine braking or stopping. In this routine braking situation, only the standard vehicle braking lights, as exemplified by brake light 480, are actuated when the LVO applies routine force to brake pedal 455, because LVP 410 receives operational signal 412 representative of a routine stop. CDSS 400 may be configured to not become actuated under such circumstances. However, if LVO of LV 405 suddenly or forcefully addresses brake pedal 455, braking sensor 460a responds to the more forceful LVO action by imparting a preselected hazard signal to signal transponder 465, which, in turn, transmits to LVP 410, operational signal 412 representative of the LVO action. The LVO action is generally representative of a preselected motive state of LV 405 (e.g., rapid slowing, immediate stop) and, thus, operational signal 412 also is adapted to be generally representative of the preselected motive state, as is the CDDS signal content emitted towards the FV and FVO.

In exemplary embodiments, similar to CDSS 200 and CDSS 300, CDSS 400 can be configured to produce a characteristic hazard alert that includes, in combination, a distinctive visual signal and a distinctive aural signal. Certain selected CDDS embodiments can be disposed to impart in CDSS 407 a distinctive visual display resembling downward moving chevron shapes, accompanied by a distinctive aural signal, including a sound capable of being heard over high-level highway sound, to unambiguously alert an FVO that an LVO is executing an abrupt "panic stop."

In certain selected embodiments, CDS 400 also may be adapted to provide CDDS encoded to represent plural motive states of LV 405. For example, during a "firm" application of force to brake pedal 455, a CDS annunciator, such as one or both of 435 and 440, may be actuated in a first predetermined diversity CDDS sequence. Similarly, during a "hard" application of force to brake pedal 455, multiple CDS annunciators, such as one or more of 435, 440, and 445 may be lit in a second predetermined diversity CDDS sequence. Additional colors, light intensities, and temporal CDDS sequences may be emitted by CDSS 400, relative to the "firm" brake application circumstance. In addition, during an emergency, or "panic" application of force to brake pedal 455 (similar to the scenario indicated in FIG. 1A-1D, or above, during LV ABS activation), visual annunciators 435, 440, 445 may be actuated with a different, more visually striking visual diversity scheme, and accompanied by a loud acoustic emission in diversity from acoustic annunciator 450. An example of an application for RFB 430, can include a sudden, hard braking by LVO of LV 405, followed shortly thereafter by deployment of LV 405 airbags, indicating a collision between LV 405 with another object. An actuation input, such as by an airbag (not shown), may trigger an alert of the highest significance or priority to be transmitted to an FVO.

Braking sensor 460a may employ a simple rheostat, or variable resistor, which can produce a signal representative of one or both of brake pedal 455 position, and the rate of brake pedal 455 application. However, numerous other well-known signal sensing devices may be used, including, without limitation, piezoelectric transducer 460b, or an inexpensive accelerometer. These simple signals can provide substantial information regarding the motive state of LV 405, particularly from the vantage of deterring a rear-end collision. Brake pedal 455 also may incorporate therein a pressure sensor, as may the pedal pivot housing generally shown with sensor 460, in lieu of, or in addition to, sensor 460, which can be configured to sense an LV operational state from the vantage of the LVO. Operational signals actuated by the LVO can be further supplemented by other relevant vehicle signals, including ABS operation sensor, airbag deployment sensor, and small, inexpensive accelerometers which can sense spatial displacements indicative of a motive state of LV 405. One or more of these supplementary signals may be combined with a signal from braking sensor 360 in transponder 465, and supplied to LVP 410. Beneficially, LVP 410 and signaler 415 can be adapted to generate CDDS content deemed appropriate for the sensed operational or motive state of LV 405, as provided or confirmed by the LVO. Through these adaptations, it may be possible to inhibit erroneous motive state signals, as might be attempted by an LVO taken by an emotional state (e.g., to respond to tailgating). However, it also is contemplated that CDS 400 may be selectively actuated by the LVO of LV 405, such as concurrently with activation of LV 405 hazard light switch 470. Switch 470, when activated, may cause CDS 400 to produce a CDDS characteristic hazard alert indicative of a preselected hazard condition, thereby warning one or more FV of a hazardous situation ahead, and causing inattentive FVOs to reflexively and appropriately respond thereto.

Figure 5A:
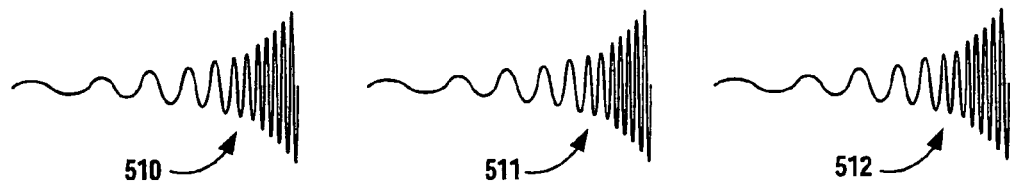
FIG. 5A-5E are illustrations of diversity signals suitable for implementations of the present invention, including visual and aural signals.
Figure 5B:
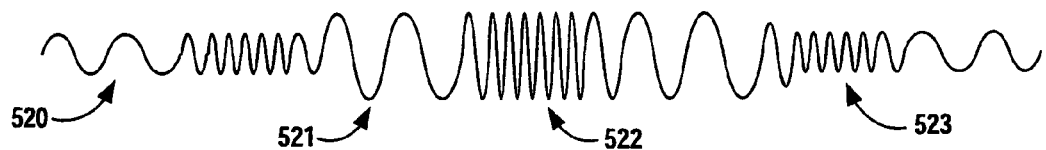

FIG. 5A-5E illustrate signaling diversity as contemplated in CDSS embodiments. FIG. 5A shows three "chirp" signals 510-512, with each chirp signal exhibiting amplitude and frequency diversity, and the cluster of chirp signals 510-512 being set apart in time, thereby exhibiting temporal diversity as well. Although commonly associated with acoustic or RF signals, chirp signals 510-512, as depicted here, also can be used to drive selected lights, thus producing visual CDDS signals in diversity. FIG. 5B depicts a repeating composite signal that includes a first waveform 520 having a first amplitude and a first frequency coupled with a second waveform 523 having the first amplitude at a second frequency, coupled with a third waveform 521 having a second amplitude at the first frequency, and coupled with a fourth waveform 522 having the second amplitude at the second frequency. As with waveforms 510-512 in FIG. 5A, diversity waveforms 520-523 may be implemented to produce audio, light, and RF CDDS signals.

Figure 5C:
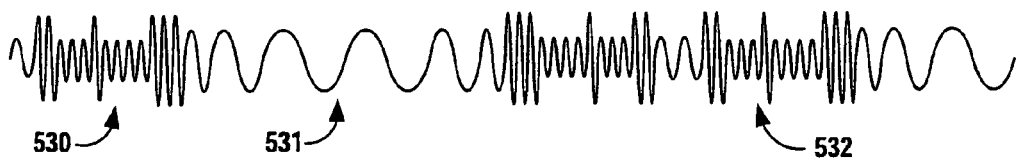
Figure 5D:

FIG. 5C depicts a repeating composite sinusoidal CDDS waveform having components 530-532, which can be representative of modal diversity exhibited in time, frequency, and amplitude. In addition, waveform components 530-532 can be interpreted as having a predetermined encoding imposed upon components 530-532, allowing the CDDS waveform in FIG. 5C to convey encoded information, if desired, as well as the information which may reside in the preselected diversity chosen for the particular CDDS waveform. In FIG. 5D, CDSS waveform is similar to that of FIG. 5C, because of certain likenesses in frequency and amplitude in respective components 540-542. However, unlike the repeating sinusoidal waveform in FIG. 5C, the repeating waveform in FIG. 5D is composed of ramp signal components 540-542. Acoustically, a perceived waveform having temporal characteristics of waveform 540-542 can have a raspy or irritating quality, when compared to the sinusoid in FIG. 5C. Visually, lights illuminated by a waveform as is illustrated in FIG. 5D tend to produce longer moments of illumination than with those components 530-532 in FIG. 5C. A light exhibiting these features may have a tendency to produce flickering or blinking light emissions, whereas a sinusoidal waveform may produce a flashing or wave-like lighting, depending upon the underlying signal frequency. Waveforms used in CDDS signaling, then, may be diversity signals of any suitable form, alone or in combination.

Figure 5E:
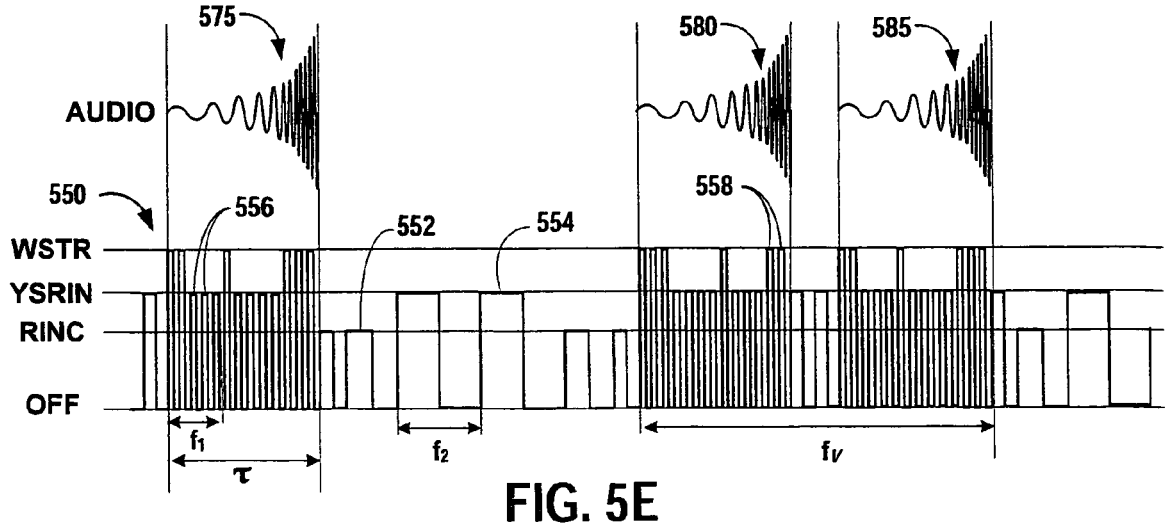

FIG. 5E illustrates that CDDS modal diversity may use any beneficial combination of diversity signals to produce a CDS. For example, a CDDS may employ both audio signals 575, 580, 585 and visual signals generally at 550. Visual CDDS signals 550 can be adapted to selectively operate a red incandescent light (RINC), an amber incandescent light and an amber flashing light (YSRIN), and a white flashing light (WSTR), for example, when such lights are energized at threshold levels. In the illustration of FIG. 5E, an amber flashing light (YSRIN), and a white flashing light (WSTR) may be actuated differentially from the torch (on, no-blink) or slow-blinking incandescent lights, by applying CDDS operational signals at a first operational signal frequency. YSRIN may be a lamp that can operate with an intense flash with one input waveform and a torch or slow-blink characteristic with a second input waveform. The torch or slow-blinking red and amber incandescent lights (RINC and YSRINC, respectively) can be actuated by applying CDDS operational signals at a second operational signal frequency. For the purposes of this example, the first operational frequency is greater than the second operational frequency.

When the CDDS operational signal frequency is in the first operational frequency range, as shown with waveforms 556, 558, either white or amber flashes may be actuated, but both incandescent lights remain extinguished. Flashing WSTR can be actuated differentially from the flashing YSRIN, when a CDDS operational signal at a first operational signal frequency $f_1$ is applied with a first operational signal amplitude 558 (voltage or current), so that WSTR is actuated and YSRIN is extinguished. When the CDDS operational signal remains at the first operational signal frequency $f_1$ but changes from the first operational signal amplitude 558 (voltage or current) to a second operational signal amplitude 556 (voltage or current), YSRIN can be actuated and WSTR can be extinguished.

In a similar manner, when the CDDS operational signal frequency is reduced to the second operational frequency range $f_2$, as shown in waveforms 552, 554, both flashing lights YSRIN and WSTR may be extinguished and the incandescent lights RINC and YSRIN can be actuated. When a CDDS operational signal at a second operational signal frequency $f_2$ is applied with a second operational signal amplitude 554, the amber incandescent light YSRIN can be actuated and RINC, extinguished. When a CDDS operational signal at a second operational signal frequency $f_2$ is applied with a third operational signal amplitude 552, the red incandescent light, RINC, can be actuated and amber incandescent light YSRIN can be extinguished. All lights are extinguished when the CDDS operational signal is reduced to OFF.

Continuing with FIG. 5E, the exemplary embodiment illustrates that audio and visual CDDS content may be coordinated to produce a particular attention raising effect on those perceiving the CDDS signal. Audio signals 575, 580, 585 are produced with period τ, which generally corresponds to the duration of the CDDS operational signal at the first operational signal frequency $f_1$. In addition, a composite modal diversity signal can be produced having a selected characteristics, and which may be encoded with selected motive state or operational data. For example, audio chirps 580, 585 can be emitted during a corresponding duplet of illumination energized at the first operational frequency. This pattern may repeat, for example, with frequency $f_v$, whereby the CDDS signal emitted to an FV may include two chirps approximately synchronized with the actuation of the flashing white and amber lights according to a predetermined signaling pattern.

Figure 6A:
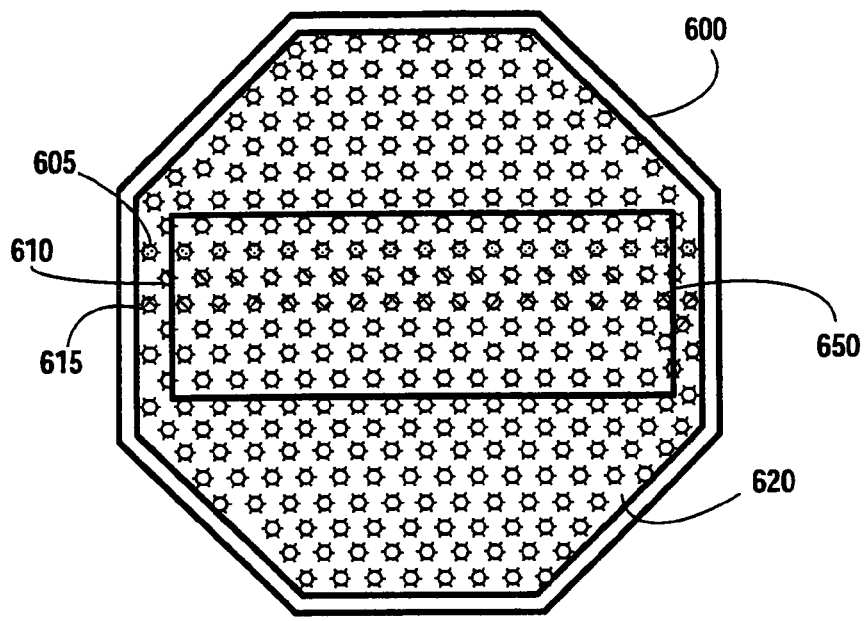
FIG. 6A is an illustration of one type of annunciator suitable for use with the embodiments of the present invention.
Figure 6B:
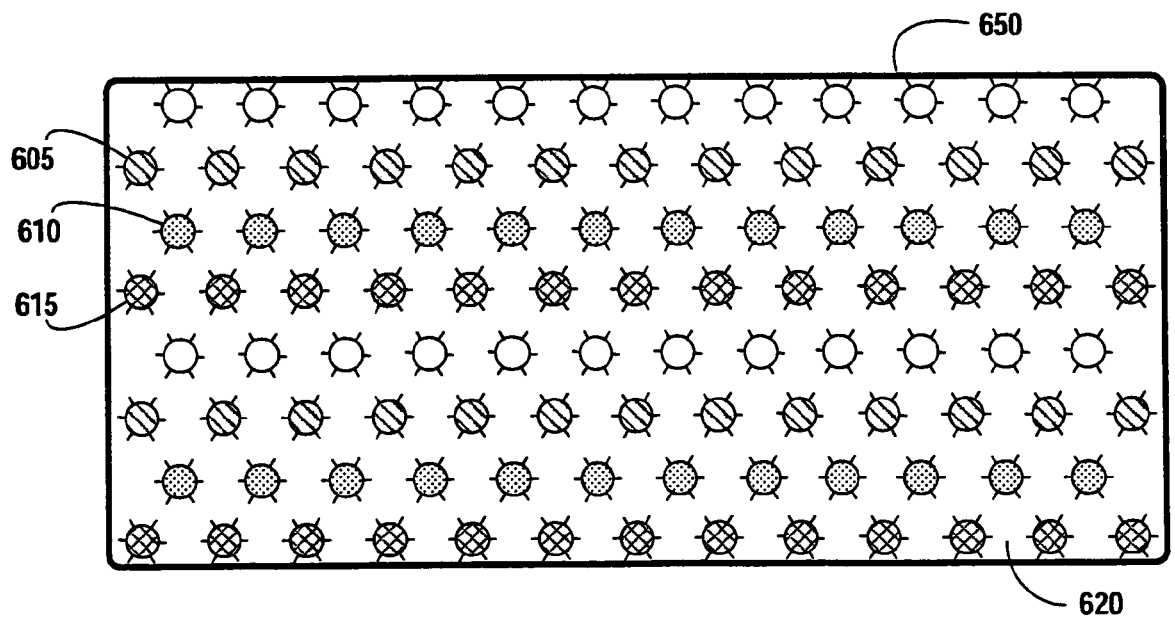
FIG. 6B is an illustration of a portion of the annunciator in FIG. 6A, whereupon constituent diversity-disposed point lights are arranged.

FIGS. 6A and 6B illustrate one type of annunciator 600 contemplated for selected embodiments of the present invention. Although the shape of annunciator 600 in FIG. 6A is a distinctive octagonal shape representative of a standard STOP sign, other shapes may be used. Indeed, it may be advantageous to employ annunciators having a matrix of individual point lamps 605, 610, 615, 620 illuminated against a reflective surface, such as reflector 625. FIG. 6B illustrates portion 650 of annunciator 600, in which interleaved ranks of point lamps 605, 610, 615, 620 are disposed. In the example of portion 650, first rank 620 may be constituted of high-intensity white lamps intended for short, bright bursts of light, such as for a stroboscopic effect. Second rank 605 may be amber-colored lamps, which may be used for torch, slow-blink, or rapid-blink signaling. Similarly, third rank 610 white-colored lamps, although producing a lower-intensity illumination, which may be used for torch, slow-blink, or rapid-blink signaling. Fourth rank 615 can include red-colored lamps, which may be used for torch, slow-blink, or rapid-blink signaling. Although light interleaving is shown as a horizontal interleaving, such is not requirement to practice the present invention. Point lamps in ranks 605, 610, 615, 620 may be dispersed among each other in a variety of orientations, in order to produce the desired, attention-seizing impact on an FVO. In addition, point lamps in ranks 605, 610, 615, 620 may be addressable individually, in small clusters, or in preselected configurations, such as to create an appearance of downward moving chevrons; stationary blinking chevrons; and combinations thereof. Also, selected point lamps in ranks 605, 610, 615, 620 may be illuminated to provide additional visual stimulation to an FVO, for example to improve LV visibility, to provide greater visual cues to an FVO regarding the space-time relationship between the LV and the FV. Such cues can be of LV position, both absolute and relative to the FV; and of fundamental distance between LV and FV, as well as cues derived from distance. Moreover, cues may be delivered in combination, or with increasing intensity to create a sense of urgency in an FV.

Many substitutions, modifications, alterations and equivalents may now occur and be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the idea of the invention.

What is claimed is:

1. A signaling apparatus for a lead vehicle having a fore and an aft, the apparatus comprising:
    a signaling structure having an obverse surface vertically configured to include a base portion and a cap portion and horizontally configured to include a lateral portion and a medial portion, and the signaling structure being affixed to the vehicle aft; and
    a first annunciator disposed on the obverse surface, receiving the variable operational signal and emitting a characteristic hazard alert responsive to the variable operational signal,
    wherein the first annunciator includes signal lights and a sonic emitter which in combination provide a characteristic hazard alert in signal diversity,
    wherein the characteristic signal alert uniquely corresponds to a preselected lead vehicle motive state,
    wherein the signaling structure is configured such that the signal lights are capable of being perceived by a following vehicle operator;
    wherein the signaling structure further comprises selected signal lights being disposed in diversity to provide a unique visual display disposed to increase conspicuity of the lead vehicle to the following vehicle operator and to correspond to a preselected characteristic of the lead vehicle motive state; and
    wherein selected ones of the lights provide at least one diversity of intensity diversity, blink frequency diversity, color diversity, and modal diversity, and the at least one signal diversity is configured to increase conspicuity of the lead vehicle to the following vehicle operator and to approximately correspond to a preselected characteristic of the lead vehicle motive state.

2. The signaling apparatus of claim 1, wherein the variable operational signal corresponds to the lead vehicle motive state of lead vehicle deceleration, and wherein the characteristic hazard alert is initiated by the variable operational signal indicating an abrupt lead vehicle deceleration, and wherein the characteristic hazard alert communicates the state of lead vehicle deceleration to, the following vehicle operator.

3. The signaling apparatus of claim 2, further comprising a second annunciator disposed substantially proximate to the signaling structure and capable of receiving the variable operational signal and emitting a second characteristic hazard alert responsive to the variable operational signal, wherein the second characteristic hazard alert is provided in a second signal diversity configured to increase conspicuity of the lead vehicle to the following vehicle operator and to approximately correspond to the lead vehicle motive state.

4. The signaling apparatus of claim 3, wherein the second annunciator comprises an acoustic emitter producing an acoustic collision deterrence signal having at least one of frequency diversity, amplitude diversity, duty cycle diversity, and modal diversity and capable of being perceived by the following vehicle operator as being indicative of a lead vehicle motive state.

5. The signaling apparatus of claim 3, wherein the second annunciator comprises electromagnetic collision deterrence signal transmitter producing an electromagnetic collision deterrence signal having at least one of frequency diversity, amplitude diversity, duty cycle diversity, and modal diversity and capable of being perceived by an electromagnetic receiver disposed in a vehicle operated by the following vehicle operator, and the receiver capable of indicating a lead vehicle motive state to the following vehicle operator.

6. The signaling apparatus of claim 5, further comprising a third annunciator configured as an acoustic emitter producing an acoustic collision deterrence signal having at least one of frequency diversity, amplitude diversity, duty cycle diversity, and modal diversity and capable of being perceived by the following vehicle operator as being indicative of a lead vehicle motive state.

7. The signaling apparatus of claim 1, wherein selected ones of the signal lights provide at least one signal diversity of intensity diversity, blink frequency diversity, color diversity, and modal diversity, and the at least one signal diversity is configured to approximately correspond to a preselected characteristic of the lead vehicle motive state.

8. The signaling apparatus of claim 1, wherein the characteristic hazard alert comprises a distinctive visual signal and a distinctive aural signal.

9. The signaling apparatus of claim 8, wherein the preselected lead vehicle motive state is the magnitude of the lead vehicle deceleration, wherein the characteristic hazard alert is approximately characteristic of the deceleration magnitude, wherein signal diversity is configured to increase conspicuity of the lead vehicle to the following vehicle operator and to be characteristic of the magnitude of the lead vehicle deceleration, thereby communicating the magnitude of the lead vehicle deceleration to the following vehicle operator.

10. The signaling apparatus of claim 9, wherein a second preselected lead vehicle motive state is approximately stopped and wherein a second characteristic hazard alert is emitted being capable of communicating the approximately stopped lead vehicle motive state to the following vehicle operator.

11. The signaling apparatus of claim 8, wherein the signal lights are vertically disposed in successive horizontal ranks of signal lights with selected ones of the signal lights having a first signal diversity and selected others having a second signal diversity, and wherein the collision deterrence signal is vertically propagated among the successive horizontal ranks of signal lights in at least one of color diversity, amplitude diversity, frequency diversity, and modal diversity.

12. The signaling apparatus of claim 11:
    wherein the apparatus produces a collision deterrence signal capable of being perceived as a column of illumination propagating among the successive horizontal ranks of signal lights from the signaling structure base upwards to the signaling structure cap portion, wherein the illumination propagates approximately proportionally to a characteristic of the lead vehicle deceleration magnitude, wherein the successive horizontal ranks of signal lights are disposed with at least one of a vertical color diversity and a vertical amplitude diversity, wherein the vertical color diversity corresponds to light emission characterized by substantially one color toward the base portion and substantially a second color toward a cap portion, and wherein the a vertical amplitude diversity corresponds to a plurality of illumination color diversity, amplitude diversity, frequency diversity, and modal diversity.

13. The signaling apparatus of claim 1, wherein the signaling structure further comprises a signaling indicia configured as a substantially unambiguous, distinctive visual stimulus capable of causing a reflexive defensive maneuver by a following vehicle operator perceiving the signaling indicia.

14. A signaling system for a vehicle, comprising: a signaling structure attached to the vehicle and having disposed thereon a signal light ray to be perceivable by a following vehicle operator; and a visual signal processor capable of receiving from the vehicle an operational signal corresponding to a motive state of the vehicle, and coupled to selectively communicate the operational signal to the signal light array; wherein the visual signal processor emits a characteristic hazard alert responsive to an operational signal representative of a preselected lead vehicle motive state, wherein the characteristic signal alert uniquely corresponds to a predetermined motive hazard, wherein a unique visual display representative of the characteristic signal alert is issued by the signal light array using collision deterrence diversity signaling to be perceivable by a following vehicle operator, wherein the unique visual display representative of the characteristic signal alert issued using collision deterrence diversity signaling comprises: a plurality of distinctive visual indicia each having a generally downward pointing generally "V" chevron shape, wherein at least a portion of the collision deterrence diversity signaling includes at least one of repeating intermittent illumination and repeating varying illumination of selected ones of the signal light array, wherein illumination of the selected ones visually proceeds from an upper vertical position of the vehicle to a lower vertical position of the vehicle, and wherein the unique visual display resembles at least one of flashing, blinking, cascading, and traveling illuminated shapes.

15. The signaling system of claim 14, further comprising:
an acoustic emitter; and
an aural signal processor capable of receiving from the vehicle an operational signal corresponding to a motive state of the vehicle, and coupled to selectively communicate the operational signal to the acoustic emitter;
wherein the aural signal processor emits a characteristic hazard alert responsive to an operational signal representative of a preselected lead vehicle motive state,
wherein the characteristic signal alert uniquely corresponds to a predetermined motive hazard, and
wherein a unique aural display representative of the characteristic signal alert is issued by the sonic emitter using collision deterrence diversity signaling to be perceivable by a following vehicle operator.

16. A method for a lead vehicle to signal, indicative of a travel path hazard, to a following vehicle therebehind, comprising: detecting a predetermined lead vehicle motive state; providing a collision deterrence signal by the lead vehicle in response to the predetermined lead vehicle motive state; and providing a visual display, and providing an aural display corresponding to the predetermined lead vehicle motive state, wherein the collision deterrence signal is a characteristic hazard alert corresponding to the predetermined lead vehicle motive state, and wherein the collision deterrence signal comprises a distinctive visual display uniquely representing the characteristic hazard alert corresponding to the predetermined lead vehicle motive state, and the distinctive visual display is evocative of moving generally chevron type shapes.

17. The method of claim 16, wherein the collision deterrence signal comprises a distinctive aural display uniquely representing the characteristic hazard alert corresponding to the predetermined lead vehicle motive state.

18. The method of claim 16, wherein the collision deterrence signal comprises a distinctive visual display and a distinctive aural display, in combination uniquely representing the characteristic hazard alert corresponding to the predetermined lead vehicle motive state.

* * * * *